United States Patent [19]
Lefebvre

[11] Patent Number: 5,591,330
[45] Date of Patent: Jan. 7, 1997

[54] OIL FILTER CONTAINING AN OIL SOLUBLE THERMOPLASTIC ADDITIVE MATERIAL THEREIN

[75] Inventor: Byron Lefebvre, Ft. Lauderdale, Fla.

[73] Assignee: T/F Purifiner, Inc., Boynton Beach, Fla.

[21] Appl. No.: 249,272

[22] Filed: May 25, 1994

[51] Int. Cl.⁶ .................................................. B01D 35/02
[52] U.S. Cl. ...................... 210/203; 210/209; 210/317; 210/484; 210/489; 210/496; 210/501
[58] Field of Search .................................. 210/203, 206, 210/209, 317, 484, 489, 501, 202, 316, 496; 137/268; 123/1 A, 196 A, 196 R; 208/182, 183; 252/9, 10, 12

[56] References Cited

U.S. PATENT DOCUMENTS

| | | | |
|---|---|---|---|
| 2,093,877 | 9/1937 | Pentz | 210/484 |
| 2,270,969 | 1/1942 | Robinson | 210/317 |
| 2,306,325 | 12/1942 | Allam | 252/190 |
| 3,224,592 | 12/1965 | Burns et al. | 210/493.4 |
| 3,598,738 | 8/1971 | Biswell et al. | 252/59 |
| 3,687,849 | 8/1972 | Abbott | 252/47.5 |
| 3,749,247 | 7/1973 | Rohde | 210/205 |
| 4,014,794 | 3/1977 | Lewis | 210/199 |
| 4,061,572 | 12/1977 | Cohen et al. | 210/168 |
| 4,066,559 | 1/1978 | Rohde | 252/10 |
| 4,075,097 | 2/1978 | Paul | 210/168 |
| 4,075,098 | 2/1978 | Paul et al. | 210/168 |
| 4,144,166 | 3/1979 | DeJovine | 252/29 |
| 4,144,169 | 3/1979 | Grueschow | 210/168 |

*Primary Examiner*—Matthew O. Savage
*Attorney, Agent, or Firm*—Nixon & Vanderhye PC

[57] ABSTRACT

An oil filter utilizes a thermoplastic material having oil oxidation and acidification arresting additives mounted in a casing between a particle filtering material (such as cotton fibers) and a felt pad. The thermoplastic material is desirably high molecular polypropylene in the form of rice-shaped pellets, or spaghetti-shaped strands. The additives comprise about 10–17 weight % of the thermoplastic material/additive combination, and as the thermoplastic material is dissolved by above ambient temperature oil, the additives are released. The thermoplastic material pellets or strands are formed by mixing anti-oxidation and anti-acidification additives with liquid thermoplastic material to form a mixture, extruding the mixture into spaghetti like strands having a thickness of about 0.0625–0.125 inches, cooling the strands, cutting the strands into discrete elements, and then placing the discrete elements into an oil filter held in place to contact oil and to gradually dissolve to release the additives.

21 Claims, 4 Drawing Sheets

OIL FILTER CONTAINING AN OIL SOLUBLE THERMOPLASTIC ADDITIVE MATERIAL THEREIN

BACKGROUND AND SUMMARY OF THE INVENTION

During the filtering of oil in working engines, particularly lubricated internal combustion engines such as in motor vehicles, [and in hydraulic equipment and automatic transmissions] oxidation and sulphur acidification of the oil commonly occur either requiring more frequent oil and oil filter changes, or adversely affecting engine operation over time. For that reason, it is known to utilize thermoplastic polymers having additives—such as anti-oxidants—incorporated therein in order to extend the time between oil filter changes and/or adequately protect the engine. Examples of these techniques are shown in U.S. Pat. Nos. 4,066,559 and 4,144,166, the disclosures of which are hereby incorporated by reference herein.

According to the present invention, a particular material, and geometric configuration, are provided which optimize the ability of an oil filter to neutralize sulfur acidification and oxidation. The material utilized according to the invention may be incorporated in an oil filter in a particular manner so as to enhance its functionality. The product is simple and easy to manufacture utilizing conventional equipment and all the materials going into manufacture are readily commercially available.

According to one aspect of the present invention, an oil filter for engines, hydraulic equipment, or automatic transmissions is provided. The oil filter comprises the following elements: A casing having first and second ends, and defining an interior volume, and having an opening adjacent the second end thereof. A particle filtering material comprising loose fibers filling up the vast majority of the interior volume. A pad of interlocked fibers covering the opening adjacent the second end of the casing. A thermoplastic material which gradually dissolves in above ambient temperature oil, the material having oil oxidation and acidification arresting additives which are released into the oil over time as the material dissolves, the thermoplastic material disposed between the particle filtering material and the pad.

The casing is typically a metal or plastic casing having a circular cross section with a pair of disc-shaped end plates and a ribbed wall with openings in both end plates. The particle filtering material typically comprises conventional long-strand, natural unbleached cotton packing (loose, not interlocked) which is compressed hydraulically to a specific air density to prevent channeling, and to achieve maximum particle retention. The natural cotton will remove some sulfur, thereby helping in reducing acidification. The pad of interlocked fibers preferably comprises a one micron felt pad (that is, for filtering out particles in the one micron size range) having a thickness of about $1/32$–$1/8$ inch (e.g. about $1/16$ inch). A conventional spin-on type of casing may be provided for the filter, if desired.

High molecular weight polypropylene has been found superior for use as the thermoplastic material compared with polyester polycarbonates, polyallomer, polyethylene, and polysulfone. Particularly desirable, polypropylene comprises ethylene propylene with a specific gravity of about 0.9, a Shore D hardness of about 70, and a tensile strength (not counting additives) of about 3900 lb./in.$^2$(e.g. 3940). The material is particularly desirable in the form of spaghetti-shaped strands having a thickness of about 0.0625–0.125 inches and a length greater than about 2 inches, or rice-shaped pellets having a thickness of about 0.0625–0.125 inches and a length of about 0.3–0.7 (e.g. about 0.5) inches.

The thermoplastic material with additives may comprise about 83–90% liquid ethylene propylene and about 10–17 weight % dispersing agent, lubricant, and detergent neutralizer. The detergent neutralizer may comprise both detergent neutralizing sulfonate and phenate. For example, the additives may comprise about 3–5% dispersing agent, about 1–1.5% organic phosphate lubricant, about 2.5–3.5% detergent neutralizing sulfonate, and about 4.5–5.5% detergent neutralizing phosphate.

According to another aspect of the present invention, a method of producing an oil filter is provided. The method comprises the steps of substantially, continuously and consecutively: (a) Mixing anti-oxidation and anti-acidification additives with liquid thermoplastic material to form a thermoplastic mixture. (b) Extruding the thermoplastic mixture from step (a) into spaghetti like strands having a thickness of about 0.0625–0.125 inches. (c) Cooling the strands. (d) Cutting the strands into discrete elements, and (e) Placing the discrete elements into an oil filter held in place to contact above ambient temperature oil to gradually dissolve to release the additives therefrom. Step (c) may be practiced utilizing a cooling trough, and step (d) utilizing a chopper which cuts the plastic strands into pellet form and empties them into bags. Rice-shaped pellets having a length of about 0.3–0.7 inches are preferred, although alternatively step (d) may be practiced to produce spaghetti-like discrete elements having lengths of over 2 inches.

According to yet another aspect of the invention, a plurality of rice-shaped pellets are provided. Each of the pellets has a thickness of about 0.0625–0.125 inches and a length of about 0.3–0.7 inches, and comprises about 83–90% ethylene propylene polypropylene with a specific gravity of about 0.9 and a Shore D hardness of about 70, and about 10–17% additives comprising a combination of dispersing agent, lubricant, and detergent neutralizer. The polypropylene dissolves in above-ambient temperature oil to release the additives therefrom.

It is the primary object of the present invention to provide for the effective construction of an oil filter which neutralizes sulphur acidification and oxidation. This and other objects of the invention will become clear from an inspection of a detailed description of the invention, and from the appended claims.

DETAILED DESCRIPTION OF THE DRAWINGS

Figure 1:
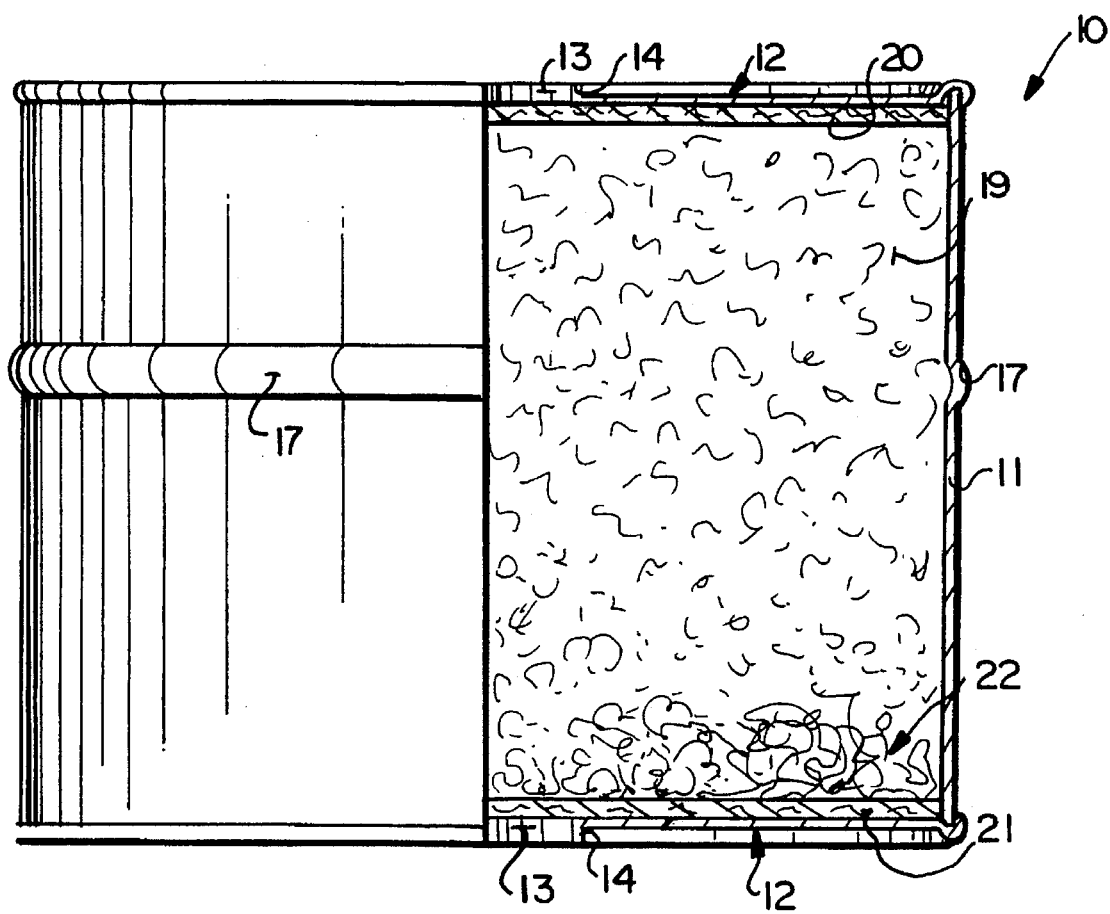
FIG. 1 is a side view, partly in cross section and partly in elevation, of an exemplary oil filter according to the present invention.
Figure 2:
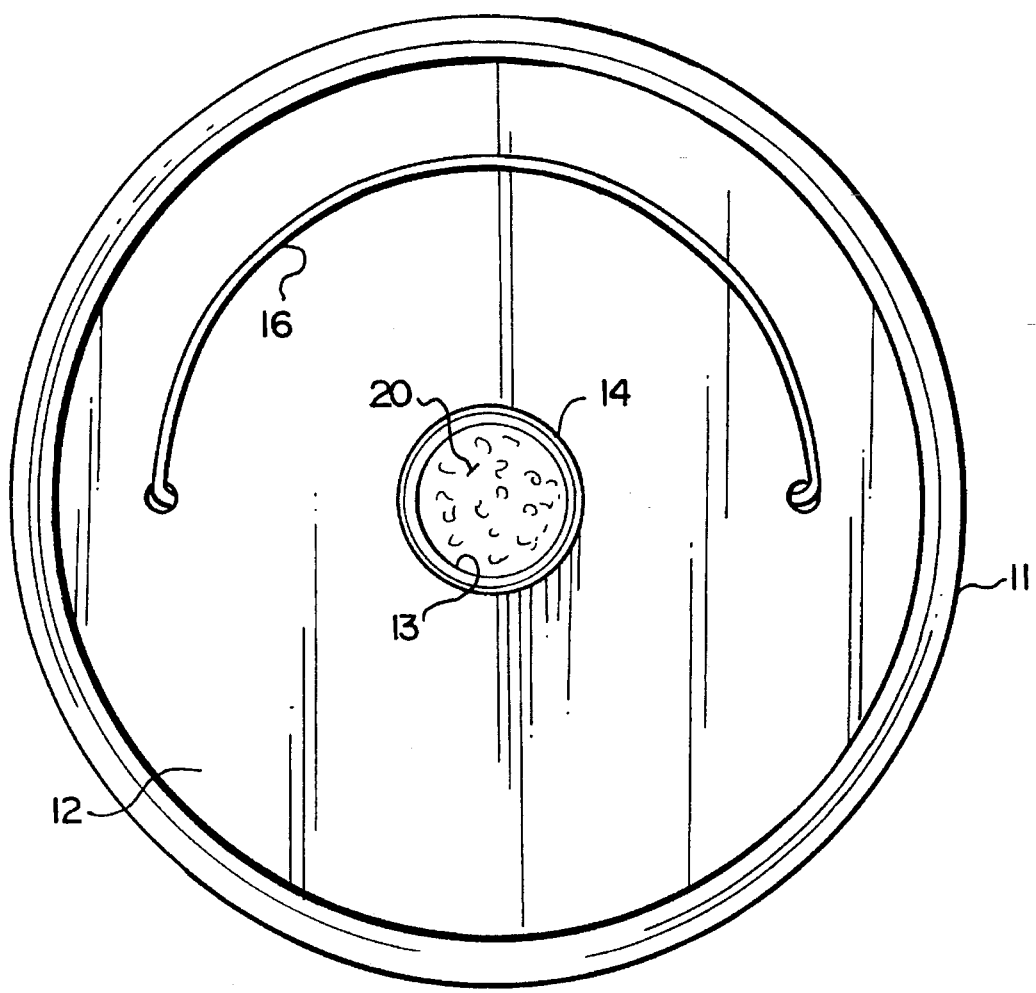
FIG. 2 is a top plan view of the oil filter of FIG. 1.
Figure 3:
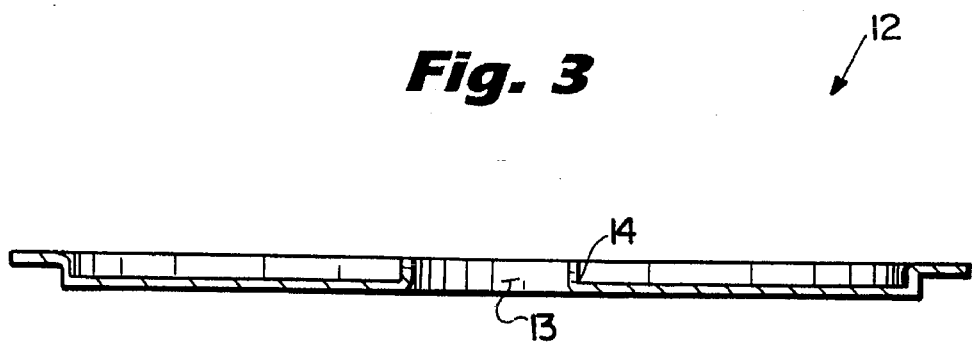
FIG. 3 is a longitudinal cross-sectional view of either the top or bottom end plate of the filter of FIGS. 1 and 2 prior to deformation of the end flange thereof.

An oil filter according to the invention is shown generally by reference numeral 10 in FIG. 1. The oil filter 10 has a casing 11 with a generally cylindrical exterior configuration with disc shaped end plates 12 at the opposite ends thereof, the disc plates having openings 13 formed concentrically therewith, and having lips or ridges 14 defining the openings 13. A bail or handle 16 may be mounted on the top end plate 12 as seen in FIGS. 1 and 2, and a strengthening rib 17 may be formed in the cylindrical wall 11 of the filter 10.

Particle filtering action is provided for the filter 10 by the particle filtering material 19 which fills up the vast majority, e.g. typically over 90%, of the hollow interior of the cylindrical casing 11. As is conventional, the particle filtering material 19 preferably comprises loose (that is, not interwoven or interlocked) natural unbleached cotton fibers. Although the fibers forming the material 19 are loose, they are densely packed within the casing 11 between the end walls 12 to prevent channeling of the oil, and will filter out particles down to about 1 micron in size, especially if used with a metering jet which reduces the flow of oil through the filter (passing in and out of openings 13) at a rate of about 6 gallons per hour.

Disposed adjacent each of the end plates 12 are a pair of pads 20, 21 of interlocked fibers. The pads 20, 21 cover the openings 13 and prevent entry of foreign material into the filter 11 and prevent the packing 19, or other interior components, from coming out. The pads 20 preferably are 1 micron felt pads having a thickness of about 1/32–1/8 inch, e.g. about 1/16 inch.

Figure 4:
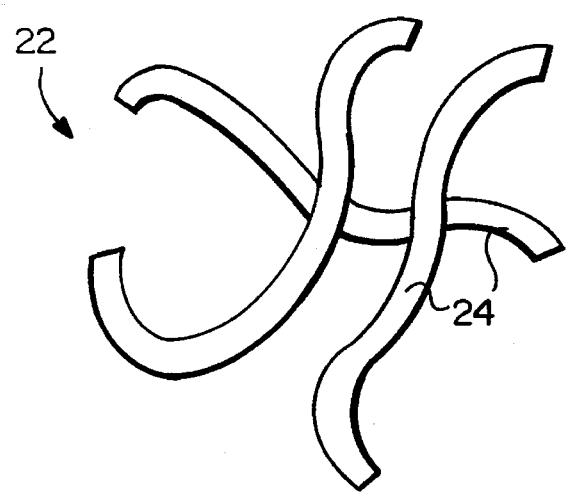
FIG. 4 is an enlarged perspective view of one geometric configuration that thermoplastic material according to the invention can take.

Disposed adjacent, and interiorly of, the "bottom" pad 21 is the thermoplastic material according to the present invention, shown generally by reference numeral 22 in FIGS. 1 and 4. It is preferred that the material 22 only abut the pad 21, being disposed between the cotton fibers 19 and the pad 21. The oil at pad 20 would typically be too cool to dissolve the material 22.

The thermoplastic material 22 has oil oxidation and acidification arresting additives which are released into the oil being filtered over time as the thermoplastic material structure for the additives gradually dissolves when in contact with above-ambient temperature oil (e.g. at a temperature of about 150° F. or above). In the embodiment illustrated in FIGS. 1 and 4, the material 22 takes the form of a plurality of spaghetti-shaped strands 24 having a thickness of about 0.0625–0.125 inches, which may be either polygonal, oval or circular in cross section, or even have an irregular cross section if that is capable of easy construction. The preferred thermoplastic material is high molecular weight polypropylene made from liquid ethylene propylene, typically having a specific gravity of about 0.9 and a Shore D hardness of about 70, and a tensile strength—absent additives—of about 3900 lb./in.$^2$ (e.g. 3940). The strands 24 may be of any length, but are typically over about 2 inches in length (but less than about a foot in length for easy handling).

Figure 6:
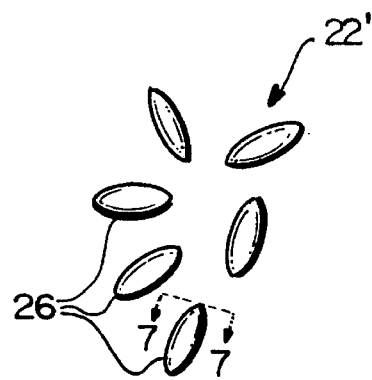
FIGS. 6 and 7 are views like those of FIGS. 4 and 5 for an alternative embodiment of geometric configuration of the thermoplastic material according to the invention.
Figure 5:
FIG. 5 is a longitudinal cross-sectional view of the strands of FIG. 4.
Figure 7:

Instead of the spaghetti shaped strands 24, the material 22—as illustrated at 22' in FIG. 6—may have the configuration of generally rice shaped pellets 26, which also have a maximum thickness of about 0.0625–0.125 inches. The pellets 26 preferably have a length of about 0.3–0.7 inches (e.g. about 0.5 inches).

The thermoplastic material 22, 22' preferably comprises about 83–90% [all percentages indicated herein are weight %] liquid ethylene propylene, and about 10–17% dispersing agent, lubricant, and detergent neutralizer combined. For example, additives provided in the polypropylene may comprise about 3–5% dispersing agent, about 1–1.5% organic phosphate lubricant, about 2.5–3.5% detergent neutralizing sulfonate, and about 4.5–5.5% detergent neutralizing phenate. In one particular embodiment according to the invention, ethylene propylene in liquid form may comprise 86.8 parts, Cooper E-644 dispersing agent 4.0 parts, Cooper E-685 zinc organic phosphate lubricant 1.2 parts, Cooper E-654 detergent neutralizing sulfonate 3.0 parts, and Cooper M-6148 detergent neutralizing phenate 5.0 parts. In the manufacture of the pellets 26 or strands 24 according to the invention, the anti-oxidation and acidification additives are mixed with the liquid thermoplastic material to form a thermoplastic mixture. Then the mixture is extruded, utilizing a conventional extruder, into spaghetti-like strands having a thickness of about 0.0625–0.125 inches. Then the strands are cooled, as in a cooling trough, and cut, as by using a conventional chopper, into discrete elements 24, 26, which are then bagged.

The discrete elements 24, 26 are placed into contact with the packed cotton 19 within the filter 10 (with the bottom plate 12 removed), then the pad 21 is put in place, and then the plate 12 placed over the pad 21 and the peripheral portions thereof bent or crimped to form a sealed filter 10, as seen in FIG. 1. Alternatively the opposite of this procedure may be employed (i.e. the bottom lid 12 is in place when the procedure is initiated). The volume and weight of material 22 will vary depending upon the needs of the particular filter 10. When the pellets 26 are utilized, the measurement of the amount of plastic added to each different sized filter 10 can be more precise.

A laboratory example of construction of the thermoplastic material according to the invention, and its use, was performed. The particular components of the test specimen were as set forth above (i.e. 86.8 parts by weight ethylene propylene, 4.0 parts by weight dispersing agent, etc.).

The laboratory test specimens were made in a Buehler 100.0 specimen maker using a one inch ram and an operating pressure of 5,000 pounds per square inch. The temperature was 250° C. max. The charge was 50 grams. After cooling the specimens were weighted and placed in a beaker containing 600 ml of thirty weight motor oil, and kept at a constant temperature of 150° F. Tests showed the overbase was released at the rate of approximately 0.4 neutralizing number per 168 hours. Oil samples with an acid number of 1.0 were allowed to set with a 2.1 inch squared surface copolymer exposed to 600 ml of oil for one week. After one week the overbase reaction reduced the acid content from 1.0 acid to 0.1.

Figure 8:
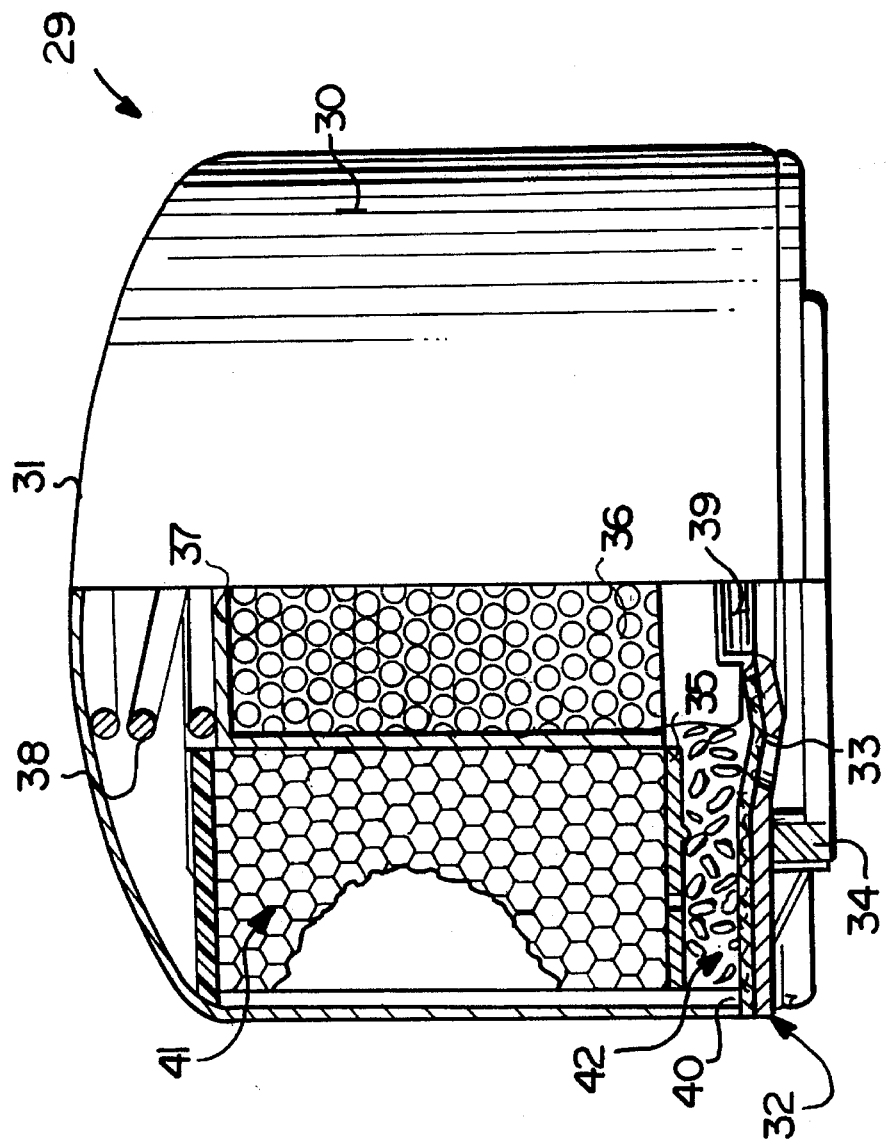
FIG. 8 is a view like that of FIG. 1 for a spin-on filter assembly embodiment according to the invention.

FIG. 8 illustrates a spin-on type of oil filter 29 that may be constructed according to the invention as an alternative to the casing construction of FIG. 1. In this embodiment, an outer metal casing 30 has a closed first end 31, and a second end in which a conventional (for commercial spin-on filters) end plate structure 32 is provided. At least one opening 33 is provided adjacent the second end, in the end plate structure 32. Typically a plurality of oil inlet openings 33 will be provided, in a circular pattern, as is conventional. A conventional seal is also provided to mate with the engine block, or the like. A threaded seal is also provided.

Mounted within casing 31 is a metal end cap 35 which may be integral with, or abut, a perforated metal core 36, having a top 37 against which a spring 38 presses. A central oil outlet opening 39 is in the middle of end plate 32. A felt pad 40, like the pad 21, is provided over the openings 33, the pad 40 having a disc shape. Between the end cap 35 and the top plate 37 is wound 100% natural unbleached cotton 41, typically about 0.125 inches in diameter and wrapped around the perforated core 36. Between end cap 35 and pad 40 is thermoplastic material 42 of the same basic construction, geometric form, and composition as the materials 22, 22' from FIGS. 4–7.

In the FIG. 8 embodiment, hot oil from an engine or the like flows through the openings 33, through the pad 40, slowly dissolves the material 42 to release oil oxidation and acidification arresting additives therefrom, is filtered by the cotton 41, and then passes through the perforations in the perforated core 36 to return to the engine or the like through opening 39.

It will thus be seen that according to the present invention a particularly advantageous product has been provided for neutralizing sulfur acidification and oxidation of oil, as well as an oil filter constructed utilizing this material, and a method of manufacture of such an oil filter. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and processes.

What is claimed is:

1. An oil filter for engines, hydraulic equipment, or automatic transmissions, comprising:
   a casing having first and second ends, and defining an interior volume, and having an opening adjacent said second end thereof;
   a particle filtering material comprising loose fibers filling up over 90% of said interior volume;
   a pad of interlocked fibers covering said opening adjacent said second end of said casing; and
   a plurality of discrete shapes of thermoplastic material which gradually dissolves in above ambient temperature oil, said thermoplastic material having oil oxidation and acidification arresting additives which are released into the oil over time as said thermoplastic material dissolves, said thermoplastic material disposed between said particle filtering material and said pad.

2. An oil filter as recited in claim 1 wherein said thermoplastic material comprises high molecular weight polypropylene.

3. An oil filter as recited in claim 2 wherein said thermoplastic material is in the form of spaghetti shaped strands having a thickness of about 0.0625–0.125 inches.

4. An oil filter as recited in claim 2 wherein said polypropylene has a specific gravity of about 0.9 and a Shore D hardness of about 70.

5. An oil filter as recited in claim 4 wherein said polypropylene, in the absence of additives, has a tensile strength of about 3900 pounds per square inch.

6. An oil filter as recited in claim 2 wherein said thermoplastic material with additives comprises about 83–90 weight % ethylene propylene, and about 17-10 weight % dispersing agent, lubricant, and detergent neutralizer combined, respectively.

7. An oil filter as recited in claim 6 wherein said detergent neutralizer comprises both detergent neutralizing sulfonate and phenate.

8. An oil filter as recited in claim 7 wherein said thermoplastic material additives comprise about 3–5% dispersing agent, about 1–1.5% organic phosphate lubricant, about 2.5–3.5% detergent neutralizing sulfonate, and about 4.5–5.5% detergent neutralizing phenate.

9. An oil filter as recited in claim 2 wherein said pad comprises a felt pad having a thickness of about 1/32–1/8 inch and a pore size of one micron.

10. An oil filter as recited in claim 2 wherein said thermoplastic material is in the form of rice-shaped pellets having a thickness of about 0.0625–0.125 inches and a length of about 0.3–0.7 inches.

11. An oil filter as recited in claim 1 wherein said particle filtering material comprises loose unbleached natural cotton fibers.

12. An oil filter as recited in claim 1 wherein said casing comprises an end plate having said opening formed therein, and a lip surrounding said opening upstanding from said end plate, and extending away from said pad.

13. An oil filter as recited in claim 1 wherein said thermoplastic material is in the form of rice-shaped pellets having a thickness of about 0.0625–0.125 inches and a length of about 0.3–0.7 inches.

14. An oil filter as recited in claim 1 wherein said thermoplastic material is in the form of spaghetti shaped strands having a thickness of about 0.0625–0.125 inches.

15. An oil filter as recited in claim I wherein said thermoplastic material is in the form of pellets.

16. An oil filter as recited in claim 15 wherein said pellets have a thickness of about 0.0625–0.125 inches and a length of about 0.3–0.7 inches.

17. An oil filter for engines, hydraulic equipment, or automatic transmissions comprising:
   a casing having first and second ends, and defining an interior volume, and having inlet and outlet openings;
   a particle filtering material comprising loose fibers disposed in said interior volume; and
   a plurality of pellets of thermoplastic material which gradually dissolve in above ambient temperature oil, said material having oil oxidation and acidification arresting additives which are released into the oil over time as said material dissolves, said pellets disposed in said interior volume adjacent said loose fibers.

18. An oil filter as recited in claim 17 wherein said pellets have a thickness of about 0.0625–0.125 inches and a length of about 0.3–0.7 inches.

19. An oil filter as recited in claim 18 wherein said pellets are rice-shaped.

20. An oil filter for engines, hydraulic equipment, or automatic transmissions comprising:
   a casing having first and second ends, and defining an interior volume, and having inlet and outlet openings;
   a particle filtering material comprising loose fibers disposed in said interior volume; and
   a thermoplastic material disposed in said interior volume adjacent said loose fibers, said thermoplastic material having oil oxidation and acidification arresting additives which are released into the oil over time as said material dissolves, said material comprising polypropylene in the form of a plurality of discrete shapes each having a thickness of about 0.0625–0.125 inches.

21. An oil filter as recited in claim 20 wherein said thermoplastic material with additives comprises about 83–90 weight % ethylene propylene, and about 17-10 weight % dispersing agent, lubricant, and detergent neutralizer combined, respectively.

* * * * *